Feb. 21, 1939.  H. E. SPEAR  2,148,308
FORWARD-TILTING CAB
Filed Oct. 30, 1937  3 Sheets-Sheet 1

Inventor:- Herbert E. Spear
By his Attorney H. Birch

Feb. 21, 1939.   H. E. SPEAR   2,148,308
FORWARD-TILTING CAB
Filed Oct. 30, 1937   3 Sheets-Sheet 2

Inventor: Herbert E. Spear
By his Attorney:

Feb. 21, 1939. H. E. SPEAR 2,148,308
FORWARD-TILTING CAB
Filed Oct. 30, 1937 3 Sheets-Sheet 3

Inventor: Herbert E. Spear
By his Attorney: H. Buch

Patented Feb. 21, 1939

2,148,308

UNITED STATES PATENT OFFICE 2,148,308

FORWARD-TILTING CAB

Herbert E. Spear, University City, Mo., assignor to Shell Development Company, San Francisco, Calif., a corporation of Delaware Application October 30, 1937, Serial No. 171,837

5 Claims. (Cl. 180—54)

This invention relates in particular to automotive vehicles such as trucks having a cab or driving compartment placed above the engine or motor employed to propel the vehicle along the surface of the ground. The more usual position of the cab or driving compartment of a motor truck having an engine mounted at its front end driving the rear wheels of the truck through a multiple gear transmission is to place the cab over the transmission at the rear of the engine.

In recent years there has been a tendency to increase the payload and consequently the size of motor trucks owing to the greater efficiencies to be achieved from such larger units. As a result of this, motor trucks have been built for which the highways and bridges are inadequate. Such trucks are cumbersome, hinder other automotive traffic and are of such long wheel base that they are difficult to maneuver.

With a view to reducing the overall length of the trucks without decreasing the pay load or carrying capacity it has been suggested to place the cab or driving compartment over the engine. The practice of so placing the cab over the motor at the forward end of the motor truck is an old expedient having been practiced on and off by manufacturers for many years. One of the disadvantages of so placing the cab is that the accessibility of the engine was greatly reduced. This drawback has been met with by various means for removing the cab from its position over the engine. Probably one of the best known of such means is that of Liepert, U. S. Patent 1,852,464, granted April 5, 1932, wherein means are described for moving the cab forward in a horizontal plane. However this method of removing the cab does not allow as complete access to the motor as is desired. Furthermore the means provided are relatively expensive to manufacture.

Now therefore it is an object of this invention to provide a cab construction wherein improved accessibility to the engine and associated mechanism is provided. A further object of the invention is to provide a cab construction wherein the controls including the steering mechanism cooperate so as to permit the cab to be tilted forward upon a fulcrum at the forward end of the vehicle. A still further object is to provide a cab construction which may be quickly removed from its position above the engine of the vehicle with the least possible effort or trouble.

The further objects in the details of construction will be readily apparent from the following description of the invention throughout which reference is had to the accompanying drawings of which:

Figure 7:
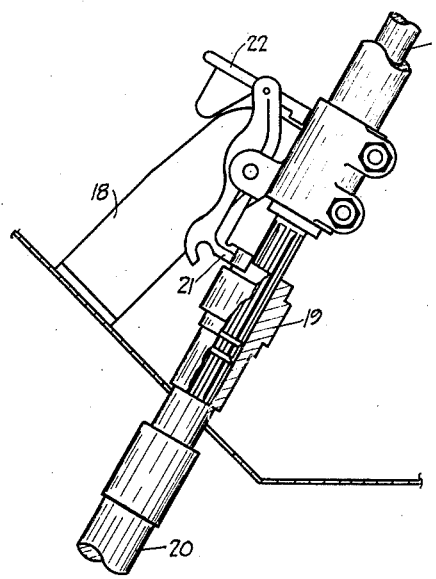
Figure 7 is a detail view partly in section of mechanism for securing the steering column.
Figure 8:
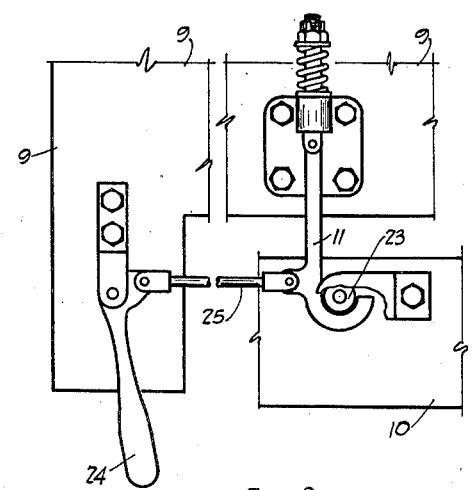
Figure 8 is a detail view showing mechanism for securing the cab in position.

With reference to the Figures 1, 2, 3 and 4, a motor vehicle having a cab 2 and side frame members 3 is shown in part. The side frame members support the engine 4 and carry the radiator 5. A hood 6 extends through the length of the cab enclosing the engine to reduce heat radiation therefrom into the cab 2. The lower edge of the front panel 1 of the cab is attached to the frame crosspiece 7 by means of hinges 8. The rear panel 9 of the cab is attached to crosspiece 10 of the frame by means of a locking clamp 11 the details of which are shown in Figure 8 and will be described in detail later herein. The steering column 12 of the vehicle is arranged to be disconnected from the chassis so that the steering wheel 13 and column 12 remain attached to the cab and tilt forward with it. The details of this feature are shown in Figure 7 and will be described later herein. A driver's seat 14 is mounted in the cab and an attendant's seat is mounted in the opposite side of the cab and the cab and seats are tilted forward together with hood 6 clear of the engine.

In order to avoid the use of long flexible control wires as well as electric wires to the indicating meters, switches etc., the latter are mounted on an instrument panel 15 forming part of the chassis. This panel therefore does not move with the cab but remains in fixed position at all times.

As will be apparent from the drawings, the cab is tilted forward by means of levers. For this purpose on the front panel 1 of the cab at each side in close proximity to the hinges 8 are mounted sockets 16, one socket being on each side of the panel. These sockets are set at an angle of approximately 45° to the horizontal (the cab being in normal upright position).

When it is desired to inspect the engine or repair the same, two levers 17 are inserted in the sockets 16, the locking device at the rear of the cab unfastened, the steering column disconnected and the cab tilted forward by manually exerting downward pressure upon the levers 17. The levers then serve as supports for the cab as (shown in Figure 3), preventing it from being scratched or otherwise damaged by contact with the ground.

Referring to Figure 7 the steering column 12 is attached to the cab 2 by bracket 18 and is provided at its lower end with a sliding sleeve or collar 19 splined to the column. The lower end of this sleeve is also splined to cooperate with the shaft 20 leading to the steering mechanism of the chassis. A catch 21 is mounted on the steering column and is arranged when in normal position to hold the collar 19 down over the jointure between the shaft 20 and the column 12 whereby the same will cooperate. The catch is held in position with a locking trip 22. When it is desired to disconnect the steering column the trip 22 is released, the catch 21 raised and the sleeve 19 moved upward until the sleeve is above the catch 21 which may then be released to hold the sleeve 19 in this upward position. The column will then be disconnected from the chassis.

Figure 8 shows the rear clamping mechanism. This comprises a spring loaded hook or clamp 11 mounted on the rear panel 9 of the cab. Cooperating with this hook is a roller 23 protruding from the chassis. In order to move said spring loaded hook into position a lever handle 24 connected to the hook by rod 25 is pivoted to the rear panel.

Figure 1:
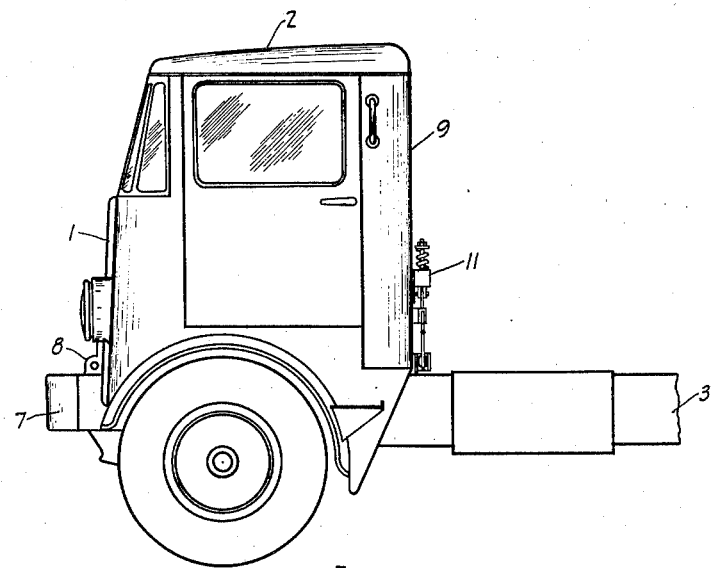
Figure 1 is a view in side elevation showing a cab constructed in accordance with the present invention.
Figure 2:
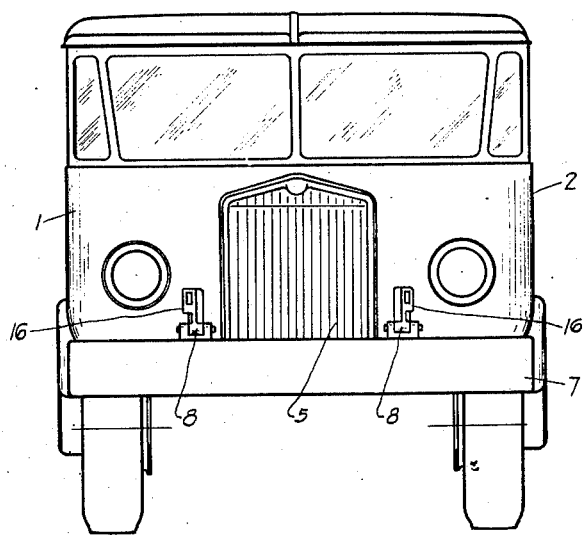
Figure 2 is a view elevation of the cab of Figure 1.
Figure 3:
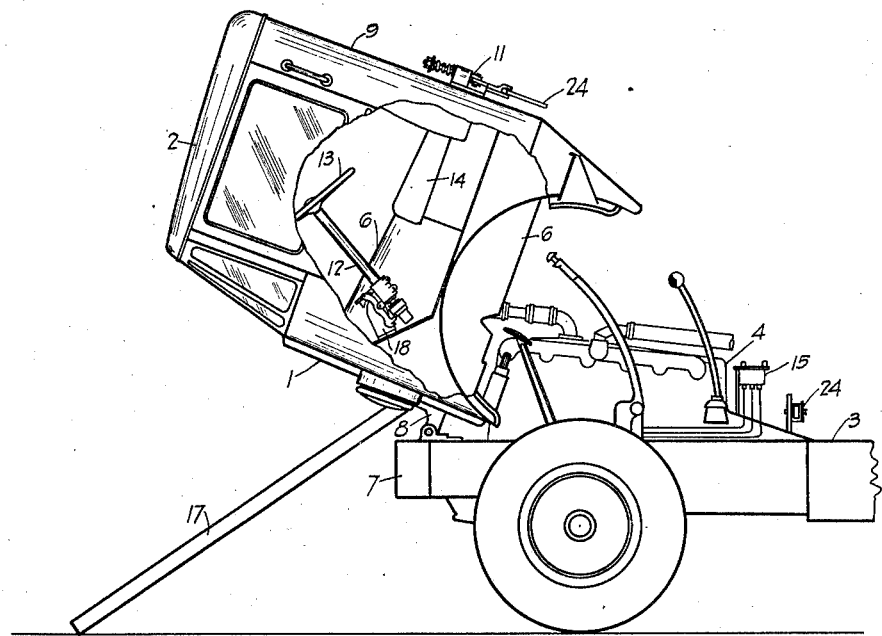
Figure 3 is a view similar to Figure 1 showing the cab partly in section and tilted forward to a position in which the engine and associated mechanism can be inspected and repaired.
Figure 4:
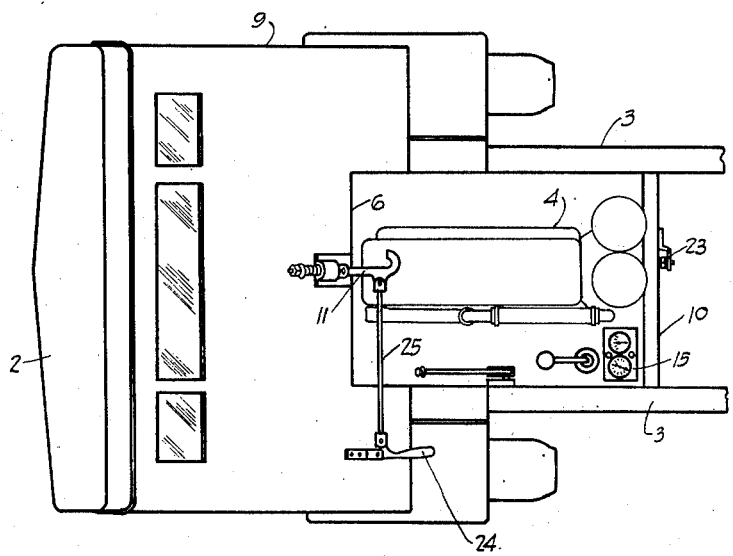
Figure 4 is a plan view of Figure 3.
Figure 6:
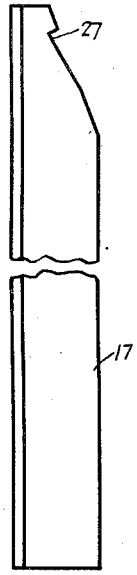
Figure 6 is a detail view of the lever shown in Figure 4.
Figure 5:
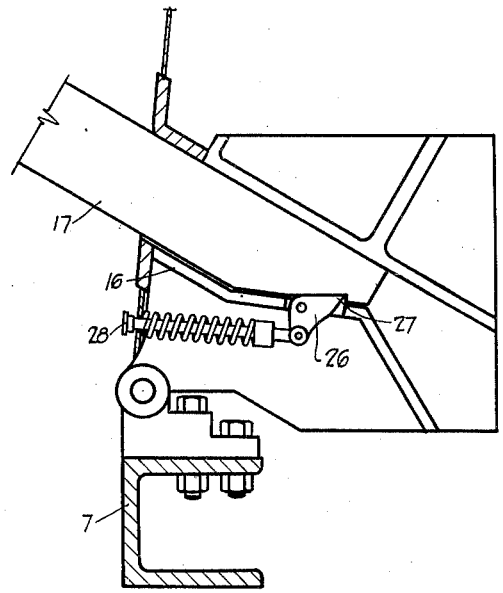
Figure 5 is a detail view of lever socket for moving the cab from its normal position.

The details of a socket 16 and hinge are shown in Figure 5. The socket, it will be noted, is provided with a spring loaded catch 26 which cooperates with the groove 27 in the end of the lever 17 to hold the same in place. A release button 28 is pressed to release the catch 26 when it is desired to remove the lever.

I claim as my invention:

1. In combination with a vehicle frame, a cab mounted thereon for forward tilting, a seat mounted within the cab and movable therewith, an instrument panel within said cab when the same is in normal position, said panel remaining attached to said frame when said cab is tilted, a steering column and wheel mounted within said cab and cooperating with steering mechanism attached to the vehicle frame, said steering column and wheel adapted to be tilted as a unit with said cab.

2. In combination with a vehicle frame, an engine mounted thereon, a cab mounted on said frame for forward tilting, a front panel to said cab, a rear panel to said cab, a centrally located hood over the engine extending longitudinally in said cab between said panels and attached thereto, seats on each side of said hood and means to tilt the whole forward upon the vehicle frame.

3. The combination described in claim 2 having sockets adapted to receive lever bars for forward tilting of the cab mounted on the forward face of said front panel.

4. In combination with a vehicle frame, an engine mounted thereon, a cab mounted on said frame for forward tilting, a front panel to said cab, a rear panel to said cab, a centrally located hood over the engine extending longitudinally in said cab between said panels and attached thereto, a steering column and wheel attached to said cab, and means to tilt the whole forward upon the vehicle frame.

5. In combination with a vehicle frame, a cab mounted thereon for forward tilting, a seat mounted within the cab and movable therewith, an instrument panel within the cab when the same is in normal position, said panel remaining attached to said frame when the cab is tilted and sockets adapted to receive lever bars for forward tilting of the cab attached to the cab.

HERBERT E. SPEAR.